United States Patent
Guglielmo et al.

(10) Patent No.: US 7,131,431 B1
(45) Date of Patent: Nov. 7, 2006

(54) ELECTRONIC PRESSURE REGULATOR

(75) Inventors: Kennon H. Guglielmo, San Antonio, TX (US); Michael W. Walser, Comfort, TX (US); Kenneth R. Shouse, San Antonio, TX (US)

(73) Assignee: EControls, Incorporated, San Antonio, TX (US)

( * ) Notice: Subject to any disclaimer, the term of this patent is extended or adjusted under 35 U.S.C. 154(b) by 0 days.

(21) Appl. No.: 10/808,206

(22) Filed: Mar. 24, 2004

Related U.S. Application Data

(60) Provisional application No. 60/457,067, filed on Mar. 24, 2003.

(51) Int. Cl.
*F02B 43/00* (2006.01)

(52) U.S. Cl. ....................................... 123/527

(58) Field of Classification Search ................ 123/527, 123/525, 529, 575, 27 GE
See application file for complete search history.

(56) References Cited

U.S. PATENT DOCUMENTS

| | | | | |
|---|---|---|---|---|
| 5,355,855 A | * | 10/1994 | Saikalis | 123/438 |
| 5,367,999 A | * | 11/1994 | King et al. | 123/458 |
| 5,904,131 A | | 5/1999 | O'Neill et al. | |
| 6,041,765 A | | 3/2000 | O'Neill et al. | |
| 6,131,552 A | * | 10/2000 | Paielli et al. | 123/527 |
| 6,176,224 B1 | * | 1/2001 | Wu et al. | 123/527 |
| 6,267,105 B1 | * | 7/2001 | Bertossi | 123/525 |
| 6,340,005 B1 | * | 1/2002 | Keast et al. | 123/27 GE |

* cited by examiner

*Primary Examiner*—Stephen K. Cronin
*Assistant Examiner*—Hyder Ali
(74) *Attorney, Agent, or Firm*—Jackson Walker, L.L.P.; William B. Nash; Mark Tidwell

(57) ABSTRACT

The present invention relates to an electronic pressure regulator that can be used for gaseous fuel control on internal combustion engines. More particularly, the present invention relates to an electronic pressure regulator that has direct acting electro-mechanical operation with pressure sensor feed back.

4 Claims, 4 Drawing Sheets

A) Static Pressure Setpoint Operation

A) Static Pressure Setpoint Operation

ELECTRONIC PRESSURE REGULATOR

CROSS-REFERENCE TO RELATED APPLICATIONS

Priority is claimed of U.S. Provisional Patent Application Ser. No. 60/457,067, filed on Mar. 24, 2003.

U.S. Provisional Patent Application Ser. No. 60/457,067, filed on Mar. 24, 2003, is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

1. Field

The present invention relates to an electronic pressure regulator that can be used for gaseous fuel-control on internal combustion engines. More particularly, the present invention relates to an electronic pressure regulator that has direct acting electro-mechanical operation with pressure sensor feed back.

2. General Background

A pressure regulator is a device that maintains a desired pressure quantity at a predetermined value or varies according to a predetermined plan. Most fuel pressure regulators for internal combustion engines have a fixed orifice and work off of a diaphragm. These regulators cannot make accommodations for variations in engine operating conditions in order to provide an optimum fuel to air mixture for gaseous fuel internal combustion engines.

Gaseous fuel means a fuel which is in the gaseous state at standard temperature and pressure. Examples of a gaseous fuels used with internal combustion engines are: compressed natural gas (derived from liquid or compressed gas storage state), and propane/butane gas (derived from liquid petroleum gas storage).

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. In one embodiment the present invention allows for dynamically controlling gaseous fuel pressure to provide an optimum gaseous fuel pressure based on selected operating conditions.

In one embodiment a butterfly valve responsive to a valve control signal regulates fuel pressure leaving the electronic control pressure regulator and entering the engine. A controller can provide the actuating signal to the butterfly valve in accordance with a pressure control algorithm.

In one embodiment, to determine the proper optimal pressure setpoint for engine operation, two modes of engine operation are considered. The first mode is stoichiometric operation, and the second is lean-burn operation.

For stoichiometric engine control, the pressure setpoint can primarily be determined by the unwanted exhaust gas emissions after a catalytic conversion process. The pressure setpoint can be manipulated higher or lower to cause slightly richer or leaner engine operation to achieve an optimum trade-off in catalytic conversion efficiency. These changes in pressure setpoint cause very small deviations in the air/fuel ratio setpoint of the engine. These deviations are on the order of 0.1% around the nominal setpoint of the stoichiometric air/fuel ratio for the engine. In a stoichiometric engine, this emissions trade-off and optimization of the catalytic conversion efficiency is an important parameter that influences the selection of the optimum pressure setpoint. This optimization can be performed during normal engine operation using a stoichiometric oxygen sensor, or exhaust gas oxygen (EGO) sensor, with real-time feedback from the sensor causing real-time changes in the instantaneous pressure setpoint of the pressure regulator. This mode of operation and the fuel optimization procedure is essentially the same with or without the use of exhaust gas recirculation (EGR).

In the second fundamental mode of engine operation called lean-burn combustion mode, the pressure setpoint of the device may be controlled to cause much larger changes in the air/fuel ratio setpoint of the engine. These changes are on the order of 10.0% or more as opposed to 0.1% for the stoichiometric case. The optimal pressure setpoint for this mode of operation is determined by running lean enough to achieve the desired emissions target while still running rich enough to achieve the desired torque target for the engine. Lean operation of the engine is additionally limited by the onset of misfire. Therefore, the optimization of the pressure setpoint is a straight forward calibration since the engine should generally be run at an air/fuel ratio only lean enough to achieve the desired emissions target with a reasonable factor of safety. This can produce the maximum engine torque at the maximum allowable undesirable exhaust emissions point. A wide-range, or universal, exhaust gas oxygen sensor (UEGO) may be used to precisely control this setpoint—although it is not required.

Both of the previous pressure optimization algorithms or procedures assume that the engine is required to meet stringent exhaust emissions regulations. However, some engines are not required to meet these types of regulations. For these engines, the pressure setpoint can be manipulated only with engine speed and load information to correct for variations in a variable venturi or fixed venturi carburetion device used downstream of the pressure control device. These variations may be a consistent deviation from the nominally desired air/fuel ratio setpoint caused by engineering design problems with the device itself, or these variations may be random deviations from the nominal setpoint caused by part-to-part production tolerance or wear-out mechanisms over time.

In the case of the stoichiometric mode of engine operation, the nominal setpoint of the engine is the stoichiometric air/fuel ratio for the fuel being used, such as natural gas or propane. In the lean-burn mode of engine operation, the nominal setpoint can be determined by reducing in-cylinder and exhaust temperatures to a level that will allow the engine to be durable over time without putting the engine into lean misfire.

If the fixed venturi or variable venturi carburetion devices are produced accurately and no other sensors are present on the engine to allow correction for variations in devices over time or due to production tolerance issues, a single static pressure setpoint may be the optimum for the device. This is the simplest and lowest cost use of the pressure control device for engine fuel control.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 4:
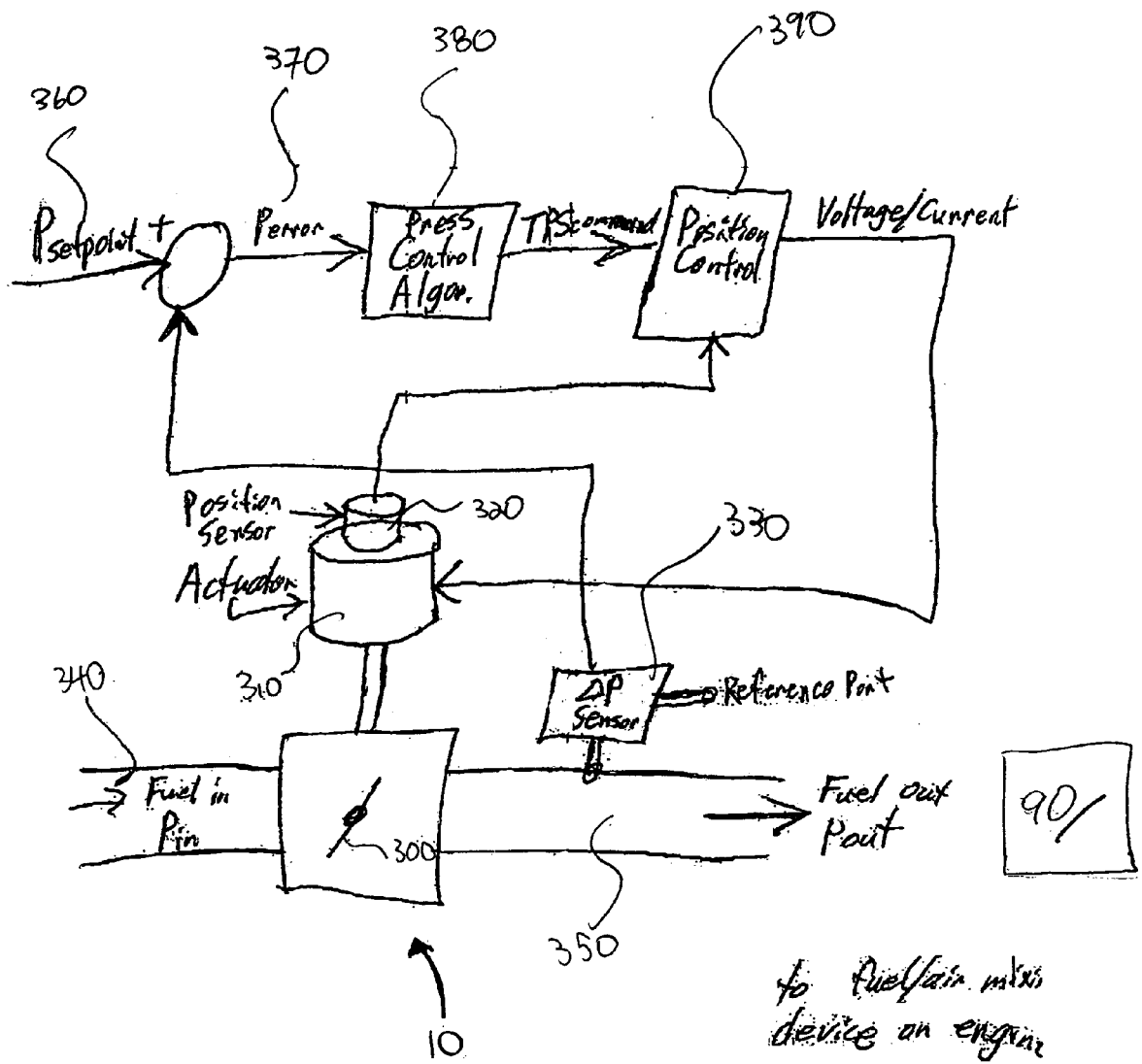
FIG. 4 is a schematic showing operation of one embodiment of the pressure control regulator.

The operation of one embodiment of pressure regulator 10 will first be described. FIG. 4 is a operation schematic showing one embodiment of the pressure regulator 10. One object is to have outlet fuel pressure 350 equal to pressure setpoint 360. Determination of pressure setpoint 360 is described below for three modes of operation, static, open loop, and closed loop operation. It is noted that pressure setpoint 360 can be dynamic and change from sampling increment to sampling increment. Outlet fuel pressure 350 is controlled by valve 300.

Valve 300, which can be a butterfly valve, is used to regulate fuel inlet pressure 340 to fuel outlet pressure 350. Fuel, at fuel outlet pressure 350, is routed to engine 90. Regulation is performed by incrementally opening and closing valve 300.

Valve 300 is incrementally opened or closed by actuator 310. The position of valve 300 is determined by position sensor 320. Actuator 310 is controlled by position controller 390. Pressure control algorithm 380 provides commands to position controller 390, which sends signals to actuator 310, which incrementally opens or closes valve 300.

Outlet fuel pressure 350 is measured by pressure sensor 330 and compared to pressure setpoint 360. The difference between these two measurements is used to calculate pressure error 370. Pressure error 370 is inputted to pressure control algorithm 380. Pressure control algorithm 380 is then used to provide a command to position control 390, which actuates actuator 310 and either incrementally opens or incrementally closes valve 300. If outlet pressure 350 is lower than pressure setpoint 360, valve 300 is incrementally opened. If higher, valve 300 is incrementally closed. The process is continued until outlet pressure 350 is within acceptable error limits to pressure setpoint 360 and/or pressure setpoint 360 is changed to a new setpoint.

Three modes of operation are described below:

A. Static Pressure Set Point Operation

Figure 1:
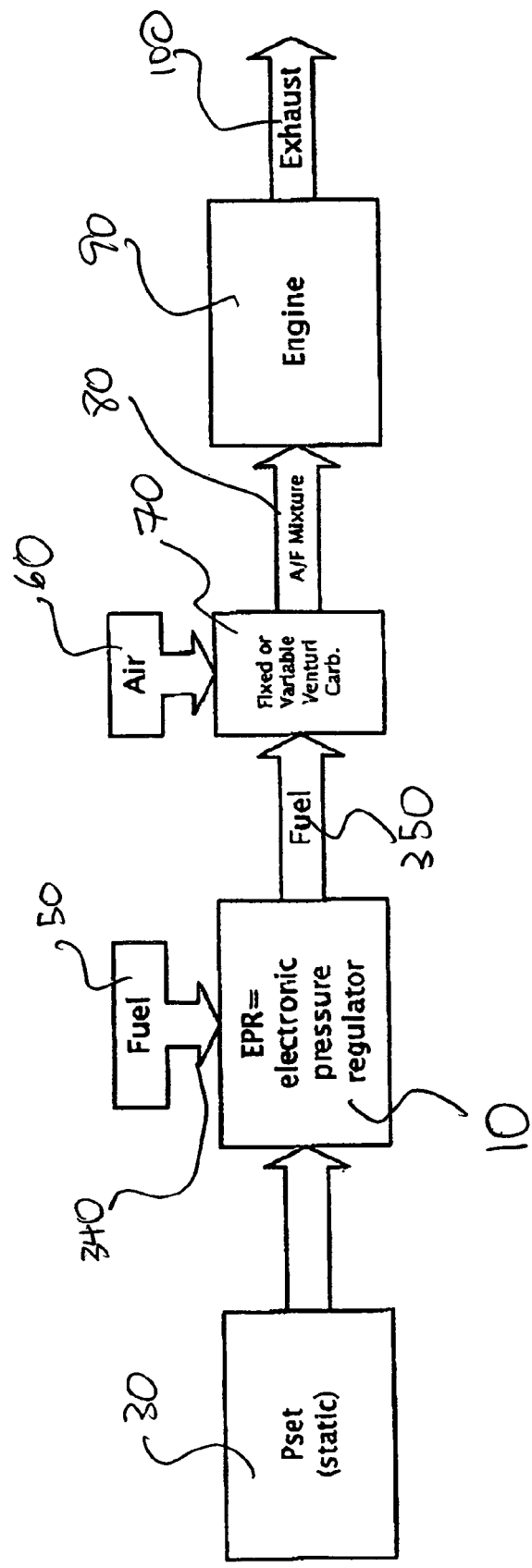
FIG. 1 is a schematic showing Static Pressure Setpoint Operation.

FIG. 1 is a schematic showing Static Pressure Setpoint Operation. In static pressure setpoint operation no additional sensors or inputs are needed to operate pressure regulator 10. A static pressure setpoint 30 is set by the user. This pressure is usually set as the nominal manufacturer's recommended supply pressure for a fixed venturi or variable venturi carburetor.

The operation of pressure regulator 10 is as described above in the discussion of FIG. 4. Pressure setpoint 360 is set to static pressure setpoint 30. In this embodiment pressure setpoint 360 should not change over time (i.e., be static), unless reset by the user.

Pressure regulator 10 is set to static pressure setpoint 30. Fuel 50 enters pressure regulator 10 at fuel inlet pressure 340 and leaves at fuel outlet pressure 350. Fuel 50 at fuel outlet pressure 350 is then combined with air 60 at carburetor 70. Air/fuel mixture 80 leaves carburetor 70, enters engine 90, and is combusted. Exhaust 100 then exits engine 90.

B. Open Loop Operation

Figure 2:
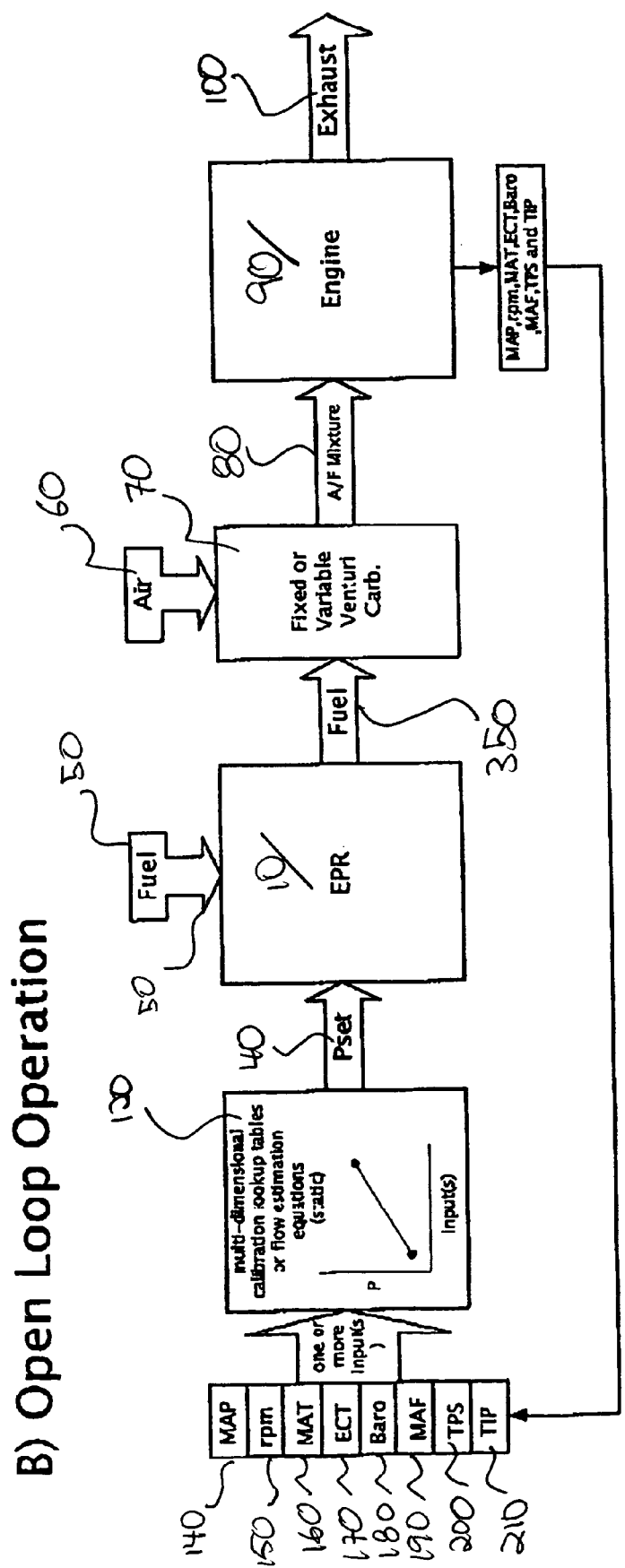
FIG. 2 is a schematic showing Open Loop Operation.

FIG. 2 is a schematic showing Open Loop Operation. In an open loop configuration various inputs are used to determine pressure setpoint 40. One or more of the following inputs are used to operate in this mode:

MAP—Manifold Absolute Pressure 140

RPM—revolutions per minute of engine (engine speed) 150

MAT—Manifold Air Temperature 160

ECT—Engine Coolant Temperature 170

Baro—Barometric Pressure 180

MAF—Engine Mass Air Flow 190

TP—Throttle position 200

TIP—Throttle Inlet Pressure 210

The operation of pressure regulator 10 is as described above in the discussion of FIG. 4. Pressure setpoint 40 is set by an algorithm based on one or more of the inputs 140 through 210 plugged into calibration tables/equations 120.

Pressure regulator 10 is set to pressure setpoint 40. Fuel 50 enters pressure regulator 10 at fuel inlet pressure 340 and leaves at fuel outlet pressure 350. Fuel 50 at fuel outlet pressure 350 is then combined with air 60 at carburetor 70. Air/fuel mixture 80 leaves carburetor 70, enters engine 90, and is combusted. Exhaust 100 then exits engine 90.

One or more of the inputs 140 through 210 are then measured at various points on the engine 90 or outside of the engine such as exhaust 100. Pressure setpoint 40 is then reset by an algorithm based on one or more of the inputs 140 through 210 plugged into calibration tables/equations 120. The functions/operations of calibration tables/equations 120 would be understood by one of ordinary skill in the art related to engine calibration and control based on the specified input parameters.

This procedure is continued throughout the operation of engine 90.

C. Closed Loop Operation With EGO/UEGO feedback

Figure 3:
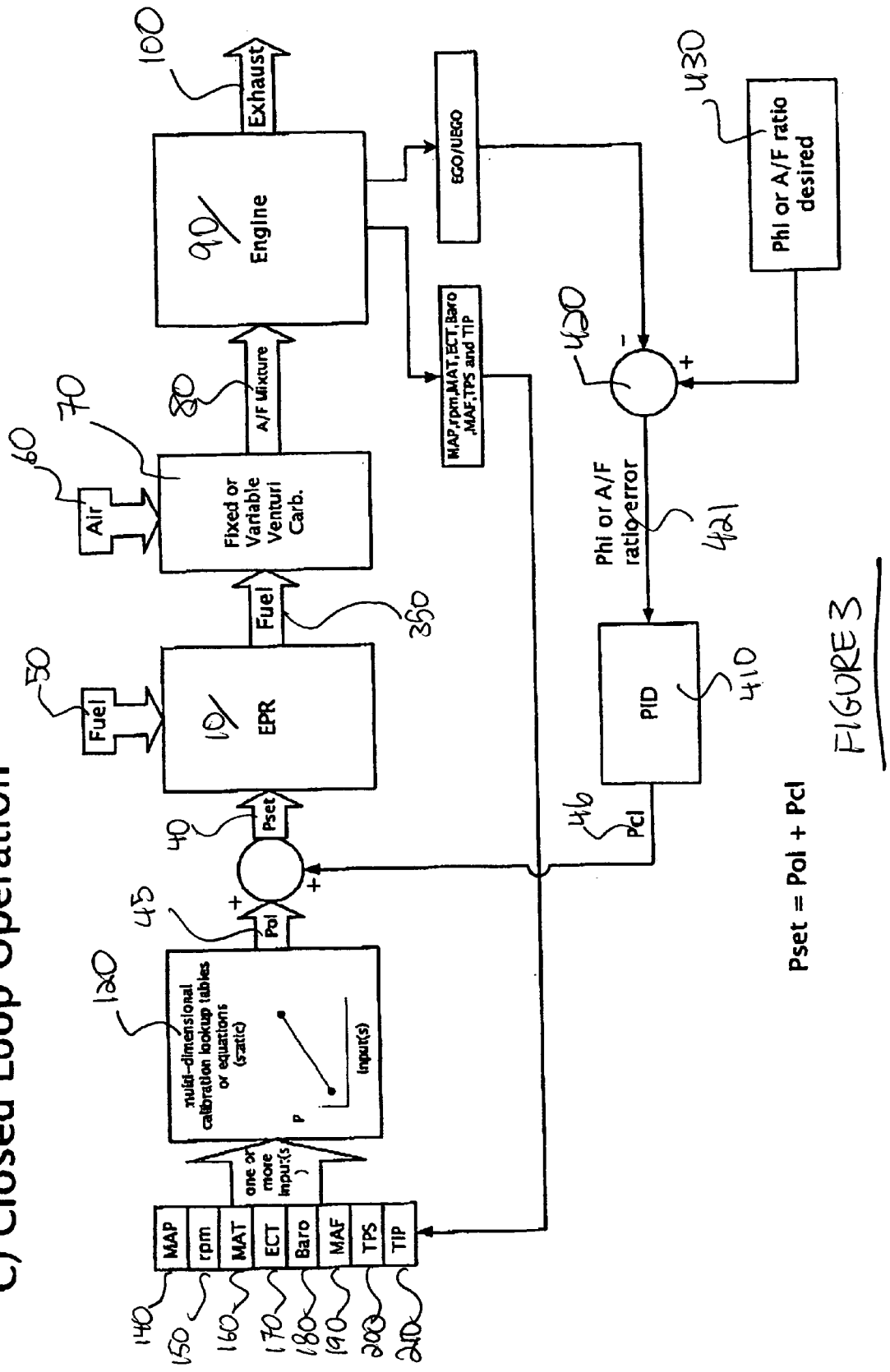
FIG. 3 is a schematic showing Closed Loop Operation.

FIG. 3 is a schematic showing Closed Loop Operation. In a closed loop configuration various inputs are used to determine first pressure setpoint 45. One or more of the following inputs are used to operate in this mode:

MAP—Manifold Absolute Pressure 140

RPM—revolutions per minute of engine (engine speed) 150

MAT—Manifold Air Temperature 160

ECT—Engine Coolant Temperature 170

Baro—Barometric Pressure 180
MAF—Mass Air Flow 190
TP—Throttle position 200
TIP—Throttle Inlet Pressure 210

Pressure setpoint 40 is calculated as a combination of the initial pressure setpoint 45 and correction pressure 46. Correction pressure 46 is calculated by on one or more of the inputs:

EGO—Exhaust Gas Oxygen Sensor 220
UEGO—Universal Exhaust Gas Oxygen Sensor 230.

The operation of pressure regulator 10 is as described above in the discussion of FIG. 4. First pressure setpoint 45 is set by an algorithm based on one or more of the inputs 140 through 210 plugged into calibration tables/equations 120. The functions/operations of calibration tables/equations 120 would be understood by one of ordinary skill in the art related to engine calibration and control based on the specified input parameters.

Correction pressure 46 is calculated based on the difference between one or more of the inputs 220 and 230 and a desired Phi or A/F ration 430. This difference is the Phi or A/F error 421 and is the input to a proportional, integral, derivative (PID) controller 410. The inputs 220 and 230 can also be combined at point 420 with a desired Phi or A/F ratio 430. Pressure setpoint 40 is calculated as the combination of first pressure setpoint 45 and correction pressure 46. In its simplest form, an error driven PID is well known to those of ordinary skill in the art of engine controls.

Pressure regulator 10 is set to pressure setpoint 40. Fuel 50 enters pressure regulator 10 at fuel inlet pressure 340 and leaves at fuel outlet pressure 350. Fuel 50 at outlet fuel pressure 350 is then combined with air 60 at carburetor 70. Air/fuel mixture 80 leaves carburetor 70, enters engine 90, and is combusted. Exhaust 100 then exits engine 90.

One or more of the inputs 140 through 230 are then measured. First pressure setpoint 45 is then reset by an algorithm based on one or more of the inputs 140 through 210 plugged into calibration tables/equations 120. Correction pressure 46 is then reset based on one or more inputs 220 and 230, differenced can also be combined at point 420 with a desired Phi or A/F ratio 430. Pressure setpoint 40 is then recalculated as the combination of reset first pressure setpoint 45 and recalculated correction pressure 46.

This procedure is continued throughout the operation of engine 90.

The following is a list of reference numerals:

LIST FOR REFERENCE NUMERALS

| (Reference Numeral No.) | (Description) |
|---|---|
| 10 | Pressure Regulator |
| 20 | Static Pressure |
| 30 | Pressure Setpoint Static |
| 40 | Pressure Setpoint |
| 45 | First Pressure Setpoint |
| 46 | Corrected Pressure |
| 50 | Fuel |
| 60 | Air |
| 70 | Carburetor |
| 80 | Air/Fuel Mixture |
| 90 | Engine |
| 100 | Exhaust |
| 110 | Calibration Lookup Table Static |
| 120 | Calibration Lookup Table and/or flow estimation equations |

-continued

LIST FOR REFERENCE NUMERALS

| (Reference Numeral No.) | (Description) |
|---|---|
| 130 | Input |
| 140 | MAP - - Manifold Absolute Pressure |
| 150 | RPM - - revolutions per minute of engine speed) |
| 160 | MAT - - Manifold Air Temperature |
| 170 | ECT - - Engine Coolant Temperature |
| 180 | Baro - - Barometric Pressure |
| 190 | MAF - - Engine Mass Air Flow |
| 200 | TP - - Throttle position |
| 210 | TIP - - Throttle Inlet Pressure |
| 220 | EGO - - Exhaust Gas Oxygen Sensor |
| 230 | UEGO - - Universal Exhaust Gas Oxygen Sensor |
| 300 | valve |
| 310 | actuator |
| 320 | position sensor |
| 330 | pressure sensor |
| 340 | inlet fuel pressure |
| 350 | outlet fuel pressure |
| 360 | pressure setpoint |
| 370 | error in pressure |
| 380 | pressure control algorithm |
| 390 | position controller |
| 410 | Proportional, Integral, Derivative Controller |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A pressure regulator and gaseous fuel internal combustion engine, comprising:
   (a) an internal combustion engine including a fuel line having an outlet in communication with the engine, the fuel line including a controllable valve for regulating the gaseous fuel pressure at the outlet;
   (b) a variable venturi or fixed venturi carburetor in communication with the fuel line outlet and the engine;
   (c) a first sensor providing a first signal corresponding to gaseous fuel pressure at the outlet;
   (d) a controller responsive to the first signal for controlling the valve and regulating gaseous fuel pressure to a desired pressure value wherein the controllable valve defines said desired pressure value for the fuel that enters the engine via the outlet; and
   (e) wherein the controllable valve is a rotary actuated butterfly valve.

2. The engine of claim 1, wherein the desired pressure is set by a user.

3. A pressure regulator and gaseous fuel internal combustion engine, comprising:

(a) an internal combustion engine including a fuel line having an outlet in communication with the engine, the fuel line including a controllable valve for regulating the gaseous fuel pressure at the outlet;
(b) a variable venturi or fixed venturi carburetor in communication with the fuel line outlet and the engine;
(c) a first sensor providing a first signal corresponding to gaseous fuel pressure at the outlet;
(d) at least one additional sensor for measuring an engine output condition;
(e) a calculator processor for direct receipt of the engine output condition and for calculating a desired gaseous fuel pressure at the outlet utilizing linear interpolation based on the input from the additional sensor in "d" and providing a second signal corresponding to the desired gaseous fuel pressure;
(f) a controller responsive to the second signal moving the controllable valve; and
(g) wherein the controllable valve is a rotary actuated butterfly valve that is responsive to the controller to adjust the gaseous fuel pressure at the outlet and obtain the desired gaseous fuel pressure value for the fuel that enters the engine via the outlet.

4. The engine of claim of claim 3 wherein the engine output is selected from the group consisting of the manifold absolute pressure, an engine speed, an manifold air temperature, an engine coolant temperature, an EGO output, a UEGO output, a barometric pressure, an engine mass air flow, a throttle position, a throttle inlet pressure, and any combination thereof.

* * * * *